Feb. 13, 1945. G. B. WATKINS 2,369,382
MULTIPLE GLAZING UNIT AND MOUNTING THEREFOR
Filed Oct. 4, 1941 2 Sheets-Sheet 2

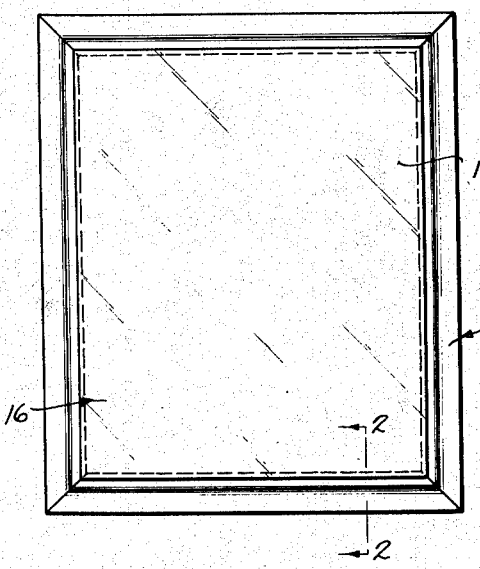
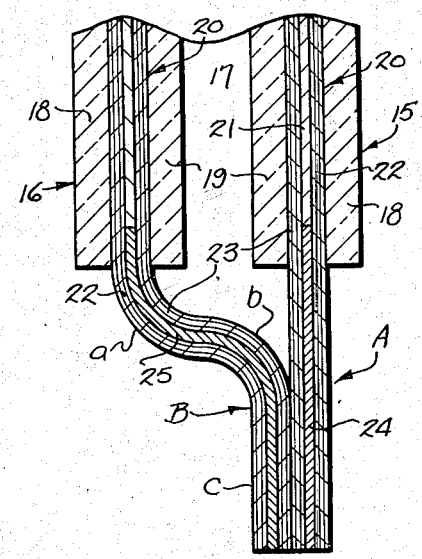
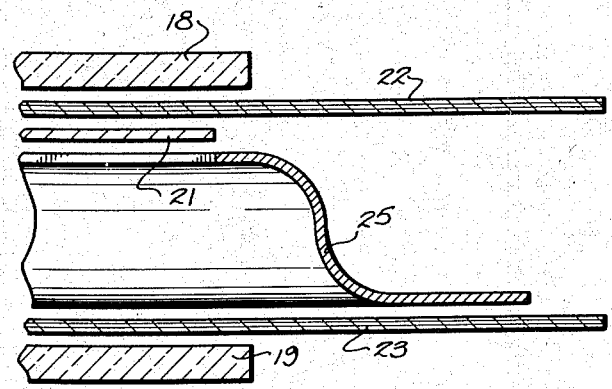
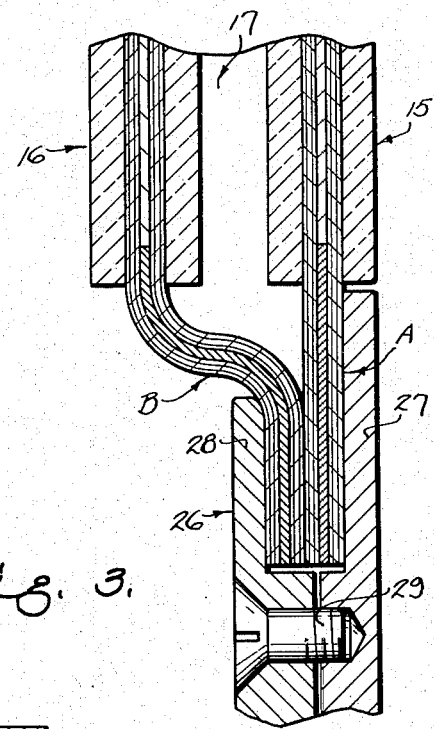
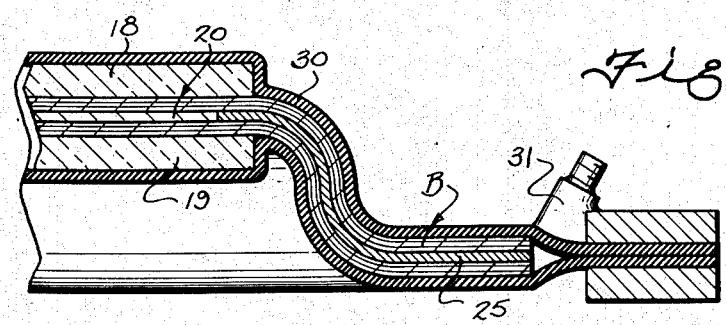

Inventor
GEORGE B. WATKINS,
By Frank Fraser
Attorney

Patented Feb. 13, 1945

2,369,382

UNITED STATES PATENT OFFICE 2,369,382

MULTIPLE GLAZING UNIT AND MOUNTING THEREFOR

George B. Watkins, Toledo, Ohio, assignor to Libbey-Owens-Ford Glass Company, Toledo, Ohio, a corporation of Ohio Application October 4, 1941, Serial No. 413,621

8 Claims. (Cl. 20—56.5)

The present invention relates to a multiple glazing unit and to the mounting thereof.

Although the glazing unit of this invention is not restricted to any particular use, it has been primarily designed for and is of utility in glazing openings in airplanes and other aircraft where the requirements are unusually stringent.

Generally stated, the type of glazing construction comprehended by the invention comprises two transparent panels arranged in face to face relation and spaced from one another by separator means arranged entirely around the edges thereof to provide an insulating space therebetween. Each transparent panel preferably consists of a sheet of laminated safety glass comprising two sheets of glass having an interposed layer of thermoplastic adherent thereto.

An object of the invention is to provide an improved multiple glazing unit of the above type having means for mounting the same of such character as to afford a certain resiliency or freedom of movement of the unit relative to the supporting frame in or upon which it is mounted whereby torsion and shock to which the airplane may be subjected will be "cushioned" and for all practical purposes will not be transmitted directly to the glass or other transparent panels, thus reducing or eliminating the tendency of cracking or shattering thereof from such cause.

Another object of the invention is the provision of a multiple glazing unit of the above type having a flexible yet substantial mounting therefor including a flexible or yielding metal supporting member permanently carried by each of the transparent panels and extending beyond the edges thereof; the flexible metal members of the two panels being secured to one another and maintaining said panels in predetermined spaced relation as well as providing an attaching flange by which the glazing unit may be initially mounted with relative ease in or upon the supporting frame, and with the further advantage that when the plane is in flight and twists, weaves or is subjected to varying pressure differentials the glass or other transparent panels will not tend to break because of its ability to "float" without introduction of localized strains.

A further object of the invention is the provision of a multiple glazing unit of the above character in which the flexible attaching flange is arranged inwardly of the outer faces of the transparent panels so that when the structure is mounted in a supporting frame or upon a support the outer face of the structure can be made flush with the outer surface of said frame or support and thus not interfere with streamlined surfaces or tend to increase wind resistance.

A still further object of the invention is the provision of a multiple glazing unit including two spaced sheets of laminated safety glass, either flat or curved, and each of which carries as a permanent and integral part thereof a flexible metal supporting member anchored in place by the plastic of the safety glass and extending beyond the edges of the glass sheets for association with one another and with the mounting means in a way that no part of said mounting means is in direct contact with the glass sheets.

Other objects and advantages of the invention will become more apparent during the course of the following description, when taken in connection with the accompanying drawings.

In the drawings, wherein like numerals are employed to designate like parts throughout the same:

Fig. 1 is a face view of a multiple glazing unit made in accordance with this invention;

Fig. 2 is a transverse section through the unit taken substantially on line 2—2 of Fig. 1;

Fig. 3 is a similar transverse section showing the mounting of the unit;

Fig. 4 is a diagrammatic sectional view illustrating the assembling of the several laminations of one of the transparent panels;

Fig. 5 is a transverse sectional view illustrating the manner in which the assembled laminations are arranged in a flexible container for subsequent pressing;

Figure 6:
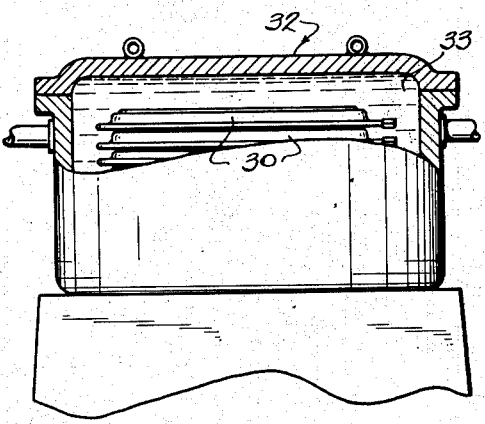
Fig. 6 is an elevation, partially in section, of an autoclave for receiving the assembly shown in Fig. 5 and in which the several laminations are composited.
Figure 7:
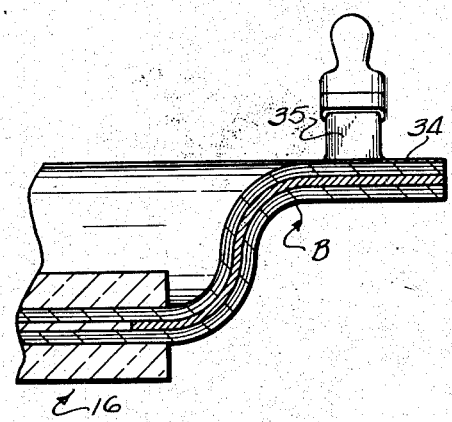
Figs. 7 and 8 are sectional views representing the coating of the two transparent panels with a solvent prior to uniting.

With reference now to the drawings, the multiple glazing unit consists generally of the two transparent panels 15 and 16 equidistantly spaced from one another throughout substantially their entire areas to provide an insulating space 17 therebetween. Each transparent panel 15 and 16 comprises a sheet of laminated safety glass including the two sheets of glass 18 and 19 bonded to one another by an interposed adherent layer of thermoplastic 20. The plastic interlayer 20 is also of a multi-ply structure comprising a central sheet or core 21 faced on opposite sides with the two plastic membranes 22 and 23 bonded to the central sheet 21 and also to the glass sheets 18 and 19 respectively to provide a unitary structure.

The glass sheets 18 and 19 may consist of ordinary plate or window glass and may be either fully tempered or semi-tempered or any desired combination of glass sheets may be used. Each of the plastic membranes 22 and 23 may consist of a single sheet, layer or film of thermoplastic of the desired thickness or it may be built up of a plurality of relatively thin sheets, layers or films to give the required thickness. By way of example, each plastic membrane may be made up of three relatively thin sheets of thermoplastic, with each individual sheet being approximately .015 of an inch thick.

The plastic sheets forming the interlayer 20 of each transparent panel 15 and 16 may be formed of a polyvinyl acetal resin and one such resin which has been used is polyvinyl butyr acetal resin plasticized with 37½ parts dibutyl sebacate per 100 parts of resin by weight. However, different plastics varying in thickness and physical characteristics may be employed as the invention is not limited to the use of any particular resin, class of resins, cellulosic derivatives or the like.

Carried by the plastic interlayer 20 of transparent panel 15 at each edge thereof is a strip of relatively thin flexible metal 24 which projects outwardly beyond the respective edges of the glass sheets 18 and 19 to form a metal supporting member, while carried by the plastic interlayer 20 of transparent panel 16 at each edge thereof is a similar metal supporting member 25. As shown, the flexible metal supporting members 24 and 25 have their inner marginal edge portions received between the two glass sheets 18 and 19 and bonded thereto by the plastic membranes 22 and 23. While the distance the metal members 24 and 25 extend inwardly of the glass edges may vary, for the average sized light or pane a distance of approximately ¼ inch has been found satisfactory.

The metal supporting members 24 and 25 may be of steel, tin, aluminum, galvanized metal or the like, and the thickness thereof may be varied. By way of example, it may be mentioned that when using aluminum a thickness of approximately .020 to .030 of an inch is satisfactory. An individual metal strip may be arranged at each edge of each transparent panel 15 and 16 and left disconnected at their adjacent ends or the adjacent ends thereof may be welded, soldered or otherwise suitably secured together to form an integral collar. Also, a single one-piece frame may be cut from a sheet of the desired metal.

It will be noted that the area of the two sheets of glass 18 and 19 of each transparent panel 15 and 16 is relatively less than the area of the plastic membranes 22 and 23 so that said plastic membranes extend beyond the edges of the glass sheets and cover the respective flexible metal members 24 and 25. More particularly, the metal members 24 and 25 are arranged between and bonded to the respective plastic membranes 22 and 23 and cooperate therewith to provide combined metal-plastic attaching flanges. The attaching flange for the transparent panel 15 is designated by the letter A while the attaching flange for transparent panel 16 is designated at B. It will also be noted that the attaching flange A of panel 15 is flat and arranged in the same plane as the plastic interlayer 20, while the attaching flange B of panel 16 is bent to form an S-curve including the two reversely bent portions $a$ and $b$ terminating in a flat outer end portion $c$ which contacts with and is bonded to the flat attaching flange A of panel 15 in a manner to be more fully hereinafter described. By shaping the attaching flange B of panel 16 in the above manner it serves as a separator means to maintain the panels 15 and 16 a predetermined distance from one another to form the insulating space 17 therebetween.

When mounting the glazing unit above described, it is secured within the opening to be glazed by clamping the flexible metal-plastic attaching flange A and B only in a frame or to a support as distinguished from clamping the marginal edge portions of the transparent panels 15 and 16, thereby giving to the mounting a certain flexibility or resiliency so that any twisting or weaving of the plane will be taken up by the metal-plastic attaching flanges instead of being transmitted directly to the laminated sheets.

By way of example, the glazing unit is shown in Fig. 3 as being secured within a frame 26 which may constitute a part of any window or windshield construction but which will be herein described as forming part of an airplane. The skin of the plane is designated by the numeral 27 and the flexible metal-plastic attaching flanges A and B of the two transparent panels overlap the inner surface of the skin and are clamped thereagainst by plates 28 secured in place by screws or other suitable fastening elements 29. As illustrated, the screws (or bolts) 29 do not pass through the attaching flanges A and B but in many cases they will be passed therethrough as well as through the skin 27 and plate 28 to still further positively anchor the glazing unit in position. The supporting frame 26 receiving the attaching flanges A and B may take a variety of different forms and therefore the invention is in no way limited to the construction of the frame within which the glazing unit is mounted or just how the attaching flanges A and B might be secured therein. As shown in Fig. 3, a relatively small space or gap is left between the peripheral edges of the outer transparent panel 15 and the inner edges of the frame 26 to permit the desired freedom of movement of the glazing unit relative to the frame without binding.

Since the flexible attaching flanges A and B only are clamped in the frame 26, it will be apparent that the glazing unit will be permitted a certain amount of floating movement to and fro in the opening due to the resiliency or yieldability of the metal and plastic. Because of this, the liability of breaking or shattering of the glass resulting from a weaving and twisting of the ship proper will be minimized.

By extending the plastic membranes 22 and 23 beyond the edges of the glass sheets 18 and 19 to cover the respective metal members 24 or 25 and in bonding the extended plastic to said metal members it is possible to obtain those advantages resulting from both the flexibility and strength of the metal as well as the cushioning effect of the plastic which is disposed between the metal and clamping portions of the frame 26. Thus, the plastic coatings on the metal serve as a gasket material when mounted and also give protection to the bond between the metal and plastic. Furthermore, the combining of the metal members 24 and 25 with the extended plastic serves to uniformly distribute the weight of the glazing unit as well as the strain placed thereon and to minimize tearing or deformation of the extended portion of the plastic. The use of the metal members with the extended plastic is also of importance in that the metal does not fatigue or elongate when subjected to alternate waves of pressure.

Another important feature of this type of glazing unit and mounting therefor is that there is provided a so-called "flush" type of installation which is of particular advantage when used in airplanes. Thus, as shown in Fig. 3, the outer surface of the outer glass sheet 18 of transparent panel 15 is flush with the outer surface of the skin 27 of the plane so as not to break the streamlined surfaces of the plane whereby wind resistance is materially reduced.

This type of glazing unit is also suitable for use in glazing stratosphere planes in which pressurized cabins or other compartments are provided to obviate the necessity for each occupant of the plane having an individual oxygen supply. When the unit is glazed in a stratosphere plane where a difference in pressure exists between one side and the other of the unit, the said unit will be permitted to move freely inwardly or outwardly relative to the supporting frame depending upon the differential in pressure.

Because of the flexibility of the metal-plastic attaching flanges A and B the glazing unit can be readily accommodated to certain irregularities in the supporting frame as well as to irregularities in the unit itself at time of installation without placing any undue strain upon the glass. This is particularly important in the glazing of airplanes due to the many curved surfaces and because of the difficulty in always obtaining a perfect matching of all of the parts. The advantage of this type of mounting is further emphasized by the fact that a relatively small percentage of the glass used in airplanes is flat and it is difficult to obtain glass curvatures which will always match perfectly with the curvatures of the skin of the plane. The glazing unit above described can also be readily and quickly mounted or removed for replacement and, in addition, the use of heavy or bulky fasteners or holders for mounting the unit is avoided. In some cases, it may be found desirable to use sheets of relatively hard plastic in place of the glass sheets 18 and 19 and the present invention therefore comprehends the use of a plastic sheet for either or both of the glass sheets 18 and 19 of either or both transparent panels 15 and 16.

In Figs. 4 to 10 inclusive are illustrated the several steps which are followed in producing the multiple glazing unit above described. In fabricating the unit, the transparent panel 15 may first be formed by properly assembling the several laminations to be joined relative to one another and then bonding them together by the combined action of heat and pressure in a suitable platen press or the like to provide a unitary structure. Upon being subjected to heat and pressure, the plastic membranes 22 and 23 will be bonded to the central sheet or core 21 and also to the glass sheets 18 and 19 respectively as well as to opposite faces of the metal members 24 to firmly secure the inner marginal edge portions of said metal members between the glass sheets.

The central sheet of plastic 21 not only serves to bond the plastic membranes 22 and 23 together but also compensates for the thickness of the metal members 24.

When forming the transparent panel 16, the flexible metal members 25 are first properly bent or shaped to the desired cross sectional curvature and then assembled with the glass sheets 18 and 19, plastic membranes 22 and 23 and central sheet of plastic 21 as illustrated in Fig. 4 to form what is termed in the art as a "sandwich." The "sandwich" is then placed in a flexible container 30 (Fig. 5) which may consist of rubber, rubber composition, or the like. To prevent adherence between the extended portions of the plastic membranes 22 and 23 and the container 30, the inside of said container is preferably covered with a thin sheet, layer or film of unplasticized cellulose acetate plastic or the like. The container 30 is then evacuated through a valve 31 associated therewith, using a vacuum of approximately 30 m. m. of mercury, at which time the extended portions of the plastic membranes 22 and 23 will be caused to conform to the curvature of the metal members 25.

The flexible container 30 and its contents are then placed in an autoclave designated in its entirety by the numeral 32 (Fig. 6) and as shown a plurality of containers may be supported one upon the other within the autoclave. A suitable heating fluid 33 is used to heat the assemblies in the autoclave and to apply the desired pressure thereto; the combined heat and pressure serving to effect the bonding of the plastic membranes 22 and 23 to the central sheet of plastic 21 and also to the glass sheets 18 and 19. Likewise, the extended portions of the plastic membranes 22 and 23 will be bonded to opposite faces of the mental members 25. If the plastics used are such as to require employment of adhesives, the proper adhesive is of course applied at the time assembly is made.

Figure 9:
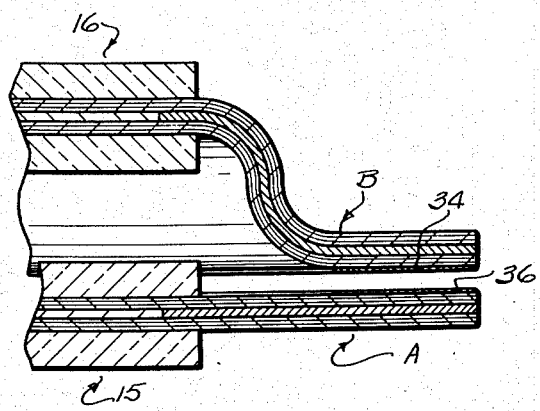
Fig. 9 is a sectional view showing the two transparent panels associated with one another in position to be united.
Figure 8:
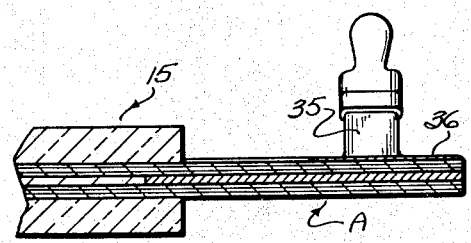
Figure 10:
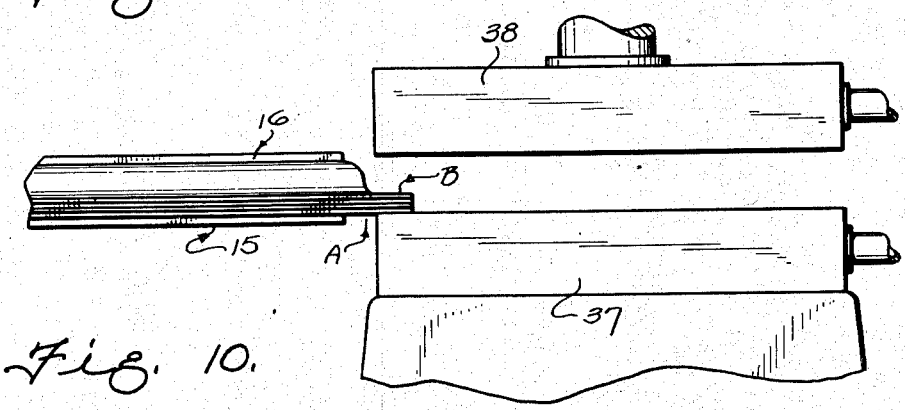
Fig. 10 is a diagrammatic representation of one form of press in which the two transparent panels may be secured together.

The finished transparent panel 16 is then removed from the autoclave 32 and container 30 and united with the transparent panel 15. This is accomplished by applying to the inner face of the flat outer end portion c of attaching flange B of panel 16 a coating 34 of a suitable solvent (Fig. 7) which may be applied thereto by a brush 35 or in any other desired manner. A similar coating of solvent 36 is applied to the inner face of the attaching flange A of panel 15. The coated surfaces of the attaching flanges A and B are then brought together as indicated in Fig. 9 and permanently united to one another. This may be effected by placing the contacting portions of the attaching flanges A and B between the platens 37 and 38 (Fig. 10) of a suitable platen press and subjecting them to heat and pressure. When the attaching flanges are acted upon by the platens 37 and 38 they will be firmly bonded together to form an integral unit. The action of the solvent coatings 34 and 36 serves to soften the plastic membranes 23 to facilitate the uniting thereof.

It is to be understood that the form of the invention herewith shown and described is to be taken as the preferred embodiment of the same, and that various changes in the shape, size and arrangement of parts may be resorted to without departing from the spirit of the invention, or the scope of the subjoined claims.

I claim:

1. A multiple glazing unit, including a pair of transparent panels arranged in spaced face to face relation, and spacer means comprising flexible metal members embedded in said panels and secured together outwardly of the edges thereof in a manner to provide a single flexible attaching flange for mounting the unit.

2. A multiple glazing unit, including a pair of transparent panels arranged in spaced face to face relation, spacer means comprising a flexible metal member embedded in one of said panels and extending outwardly in a straight line beyond the edges thereof, a second flexible member embedded in the other of said panels and shaped to bring it toward said first-mentioned member, and means for securing said members together as a single flexible attaching flange for mounting the unit in a frame.

3. A multiple glazing unit, including a pair of transparent panels arranged in spaced face to face relation, each of said panels including two outer sheets of a relatively hard material and an inner sheet of thermoplastic bonded to said outer sheets, and spacer means comprising flexible metal members carried by and forming an integral part of the thermoplastic sheet of each panel and secured together outwardly of the edges of said outer sheets in a manner to provide a single flexible attaching flange for mounting the unit.

4. A multiple glazing unit, including a pair of transparent panels arranged in spaced face to face relation, each of said panels including two outer sheets of a relatively hard material and an inner sheet of thermoplastic bonded to said outer sheets, spacer means comprising a flexible metal member carried by and forming an integral part of the thermoplastic sheet of one of said panels and extending outwardly beyond the edges of the outer sheets thereof, a second flexible metal member carried by and forming an integral part of the thermoplastic sheet of the other of said panels and shaped to bring it toward said first-mentioned member, and means for securing said members together as a single flexible attaching flange for mounting the unit in a frame.

5. A multiple glazing unit, including a pair of transparent panels arranged in spaced face to face relation, each of said panels comprising two sheets of glass and an interposed layer of thermoplastic adherent thereto, the area of the plastic interlayer of each panel being relatively greater than the area of the glass sheets so that it extends outwardly beyond the edges of said sheets, and spacer means comprising flexible metal members carried by the extended portion of each plastic interlayer and forming metal-plastic flanges secured together outwardly of the edges of said glass sheets in a manner to provide a single flexible attaching flange for mounting the unit.

6. A multiple glazing unit, including a pair of transparent panels arranged in spaced face to face relation, each of said panels comprising two sheets of glass and an interposed layer of thermoplastic adherent thereto, the area of the plastic interlayer of each panel being relatively greater than the area of the glass sheets so that it extends outwardly beyond the edges of said sheets, spacer means comprising a straight flexible metal member carried by the extended portion of one of said plastic interlayers and forming a metal-plastic flange, and a second flexible metal member carried by the extended portion of the other of said plastic interlayers to form a metal-plastic flange and shaped to bring it into engagement with said first-mentioned flange, said metal-plastic flanges being secured together as a single flexible attaching flange for mounting the unit in a frame.

7. A multiple glazing unit, including a pair of transparent panels arranged in spaced face to face relation, and spacer means comprising flexible metal members embedded in said panels and secured together outwardly of the edges thereof in a manner to provide a single flexible attaching flange for mounting the unit, at least one of said flexible metal members being shaped with a double reverse bend to bring it toward the other of said members.

8. A multiple glazing unit, including a pair of transparent panels arranged in spaced face to face relation, spacer means consisting of a flexible metal member embedded in one of said panels, a second flexible member embedded in the other of said panels, at least one of said members being bent to bring it toward the other of said members, and means for securing the members together and sealing the opening between the spaced panels.

GEORGE B. WATKINS.